United States Patent
Ramesh

(10) Patent No.: US 6,646,049 B2
(45) Date of Patent: Nov. 11, 2003

(54) HIGH-SOLIDS THERMOSET BINDERS FORMED USING HYPERBRANCHED POLYOLS AS REACTIVE INTERMEDIATES, COATING COMPOSITIONS FORMED THEREWITH, AND METHODS OF MAKING AND USING SAME

(75) Inventor: Swaminathan Ramesh, Canton, MI (US)

(73) Assignee: BASF Corporation, Southfield, MI (US)

( * ) Notice: Subject to any disclaimer, the term of this patent is extended or adjusted under 35 U.S.C. 154(b) by 6 days.

(21) Appl. No.: 09/952,732

(22) Filed: Sep. 14, 2001

(65) Prior Publication Data

US 2002/0026015 A1 Feb. 28, 2002

Related U.S. Application Data

(63) Continuation-in-part of application No. 09/470,405, filed on Dec. 22, 1999, now Pat. No. 6,569,956.

(51) Int. Cl.$^7$ .................... C09D 133/14; C09D 171/02; C09D 167/02

(52) U.S. Cl. ...................... 525/111; 525/162; 525/174; 525/406; 525/407; 525/408; 525/438; 525/440; 525/443; 525/444; 525/131

(58) Field of Search ............................... 525/131, 440, 525/408, 111, 162, 174, 406, 407, 438, 443, 444

(56) References Cited

U.S. PATENT DOCUMENTS

| | | | |
|---|---|---|---|
| 2,979,514 A | 4/1961 | O'Brien | 260/340.2 |
| 3,479,328 A | 11/1969 | Nordstrom et al. | 260/86.1 |
| 3,674,838 A | 7/1972 | Nordstrom | 260/482 |
| 4,126,747 A | 11/1978 | Cowherd et al. | 520/166 |
| 4,279,833 A | 7/1981 | Culbertson et al. | 260/464 |
| 4,301,257 A | 11/1981 | Zengel et al. | 525/329 |
| 4,340,497 A | 7/1982 | Knopf | 252/188.3 |
| 4,758,632 A | 7/1988 | Parekh et al. | 525/383 |
| 4,791,168 A | 12/1988 | Salatin et al. | 524/601 |
| 4,820,830 A | 4/1989 | Blank | 560/158 |
| 5,326,815 A | 7/1994 | Serdiuk et al. | 524/591 |
| 5,356,669 A | 10/1994 | Rehfuss et al. | 427/407.1 |
| 5,373,069 A | 12/1994 | Rehfuss et al. | 525/456 |
| 5,418,301 A | 5/1995 | Hult et al. | 525/437 |
| 5,563,208 A | 10/1996 | König et al. | 524/591 |
| 5,663,247 A | 9/1997 | Sörensen et al. | 525/533 |
| 5,792,810 A | 8/1998 | Menovcik et al. | 524/590 |
| 5,834,118 A | 11/1998 | Ranby et al. | 428/482 |
| 5,852,162 A | 12/1998 | Smith et al. | 528/272 |
| 5,869,191 A | 2/1999 | Clemons Van Gaalen et al. | 428/842 |
| 5,945,499 A | 8/1999 | Ohrbom et al. | 528/75 |
| 5,976,615 A | 11/1999 | Menovcik et al. | 427/140 |
| 6,376,596 B1 | 4/2002 | Barsotti et al. | 524/500 |
| 6,462,144 B1 * | 10/2002 | Ramesh | 525/438 |
| 6,515,192 B1 | 2/2003 | Rink et al. | 585/16 |

FOREIGN PATENT DOCUMENTS

| | | | |
|---|---|---|---|
| DE | 199 40 855 | 3/2001 | C08G/63/20 |
| EP | WO93/17060 | 9/1993 | C08G/63/02 |
| EP | WO94/10211 | 5/1994 | C08F/8/30 |
| EP | WO97/45474 | 12/1997 | C08G/81/00 |
| WO | WO00/18516 | 4/2000 | |

OTHER PUBLICATIONS

Bo Pattersson, Perstorp Polyols– Application Technology, S–284 80 Perstorp SWEDEN, entitled Hyperbranched polymers– unique design tools for multi property control in resin and coatings, pp. 1–19, and Generations 2–4.

Young H. Kim, DuPont CR&D, Experimental Station, E328/261, Wilmington, Delaware 19808, Apr. 13, 1998, pp. 1685–1698.

M. Trollsås et al., entitled Highly functional branched and dendri–graft aliphatic polyesters through ring opening polymerization, vol. 31, No. 9, 1998, pp. 2756–2763.

English Language Abstract for WO00/18516 is on front page of the International Publication.

Rink, et al., 10/049,607, filed Feb. 14, 2002, entitled "Solventborne coating material and its use," pages.

Ramesh et al., 10/106,000, filed Mar. 25, 2002, entitled "Carbamate–functional resins and there use in high solids coating compositions", p. 1–40.

Ramesh, 10/040,819, filed Jan. 7, 2002, entitled "Hyperbranched polyol macromolecule, method of making same, and coating composition including same", p. 1–16, and 1 page of Drawing.

Kim, 1999, entitled "Progress in Hyperbranched polymers," p. 61.

Brenner, 1995, entitled "Hyperbranched polymers: modification with flexible chains" pp. 176–177.

* cited by examiner

Primary Examiner—Patricia A. Short

(57) ABSTRACT

A binder for a coating composition is formed using a principal resin polyol, in combination with a hyper-branched polyol as a reactive intermediate, and at least one crosslinker. The principal resin polyol is at least one of a polyester polyol, a polyether polyol, and a polyacrylate. Hyper-branched polyester polyols may be used as reactive diluents, which will cross-link with isocyanates, isocyanurates, epoxides, anhydrides or their corresponding polyacids and/or aminoplasts to form a binder having particular properties, to help control the rheology of a coating system. The hyperbranched polyol, the principal resin polyol, or both may, optionally, include a carbamate functional group in the structure thereof. Coating compositions may be made using the binders together with additional components.

23 Claims, No Drawings

HIGH-SOLIDS THERMOSET BINDERS FORMED USING HYPERBRANCHED POLYOLS AS REACTIVE INTERMEDIATES, COATING COMPOSITIONS FORMED THEREWITH, AND METHODS OF MAKING AND USING SAME

CROSS-REFERENCE TO RELATED APPLICATIONS

The present application is a continuation-in-part of U.S. patent application Ser. No. 09/470,405, filed Dec. 22, 1999, now U.S. Pat. No. 6,569,956 the disclosure of which is incorporated herein by reference.

BACKGROUND OF THE INVENTION

1. Field of the Invention

The present invention relates to coating compositions, to binders for use in formulating coating compositions, and to methods of making and using such binders and compositions.

More particularly, the present invention relates to binders that are made using one or more hyperbranched polyols as reactive intermediates, to thermoset coating compositions incorporating such binders, and to methods of making and using same.

2. Description of the Background Art

Certain hyperbranched macromolecules are known for use in preparing high-solids coating compositions.

U.S. Pat. No. 5,418,301 to Hult et al. discloses a dendritic macromolecule, which is formed beginning with a central initiator molecule having reactive hydroxyl groups thereon. A monomeric chain extender is attached to each of the reactive hydroxyl groups to form a highly branched structure. A chain stopper molecule may, optionally, be added to the chain extender to further increase the size of the macromolecule, and to terminate the macromolecule-forming reaction.

U.S. Pat. No. 5,663,247 to Sorensen et al. discloses another hyperbranched polyester macromolecule, formed from an epoxide nucleus and hydroxy-functional carboxylic acid chain extenders, and a method of making the hyperbranched macromolecule.

Other polyesters are disclosed in U.S. Pat. Nos. 5,852,162 and 5,869,191.

Some coating compositions, formed with the known linear polyols as reactive intermediates, exhibit some tendency to crack when they are flexed. Such relatively brittle materials are less than optimal for use in making coating compositions that are intended to be applied to automotive bodies or flexible materials, such as resiliently bendable plastics or elastomers. Since modem engineering often combines dissimilar materials such as, e.g., metal and plastics or elastomers into an assembled product to be painted, a need exists for coatings that are useful to paint all of such dissimilar materials.

Many known polyurethane binders may be formed by reacting long-chain linear polyols with isocyanates. Polyurethane coatings may be powder coatings or may be waterborne dispersions. Polyurethane coatings are further divisible into one-component and two-component systems. Various polyurethane and carbamate-containing compositions are disclosed in U.S. Pat. Nos. 4,279,833, 4,791,168, 4,820,830, 5,326,815, 5,373,069, 5,563,208, 5,792,810, 5,945,499, and 5,976,615.

While many different types of coatings are known, the coatings art needs improved coating compositions that are strong and durable, yet which will still have good flexibility and resiliency.

The coatings art also has an ongoing need for coating compositions that will be good bonding substrates, for providing a good surface to receive subsequent repair finishes applied thereto.

Further, the coatings art is continually seeking coating compositions with reduced levels of organic solvents used therein, to minimize the volatile organic content (VOC), while keeping other useful properties, such as viscosity, sprayability, and rheology control for resisting sagging in application thereof, within acceptable ranges.

SUMMARY OF THE INVENTION

The present invention provides a binder comprising: a) a principal resin polyol comprising at least one of a polyester polyol, a polyether polyol, and a polyacrylate; b) a hyperbranched polyol comprising both external and partially embedded hydroxyl groups in the structure thereof; and c) a crosslinker.

The present invention also provides a method of making a coating composition, comprising: a) providing a principal resin polyol as a first reactant, the principal resin polyol comprises at least one of a polyester polyol, a polyether polyol, and a polyacrylate; b) providing an effective amount of a second reactant to the principal resin polyol to form a polyol reaction mixture, wherein the second reactant is a hyperbranched polyol comprises both external and partially embedded hydroxyl groups in its structure; c) providing an effective amount of a polymerization catalyst; d) providing a crosslinker; and e) adding a solvent.

The present invention also provides a method of making a binder comprising: a) providing a principal resin polyol as a first reactant, the principal resin polyol comprises at least one of a polyester polyol, a polyether polyol, and a polyacrylates; b) providing an effective amount of a second reactant to the principal resin polyol to form a polyol reaction mixture, wherein the second reactant is a hyperbranched polyol comprising both external and partially embedded hydroxyl groups in the structure thereof; and c) providing a crosslinker to the reaction mixture.

A thermoset coating composition comprising a solvent and a mixture of: a) a principal resin polyol comprising at least one of a polyester polyol, a polyether polyol, and a polyacrylate; b) a hyperbranched polyol having both external and partially embedded hydroxyl groups in the structure thereof; c) a crosslinker; and d) an effective amount of a polymerization catalyst.

DETAILED DESCRIPTION OF THE PREFERRED EMBODIMENT

Throughout the following detailed description and in the examples therein, all parts are by weight of the total solids portion of the composition, unless otherwise specified.

The present invention provides a thermosettable binder for a polymeric coating composition and a coating composition made therewith, in which the binder is formed using a hyperbranched polyol as a reactive intermediate. Binders according to the present invention incorporate a principal resin polyol, together with at least one hyperbranched polyol as a reactive intermediate, and at least one crosslinker.

More specifically, a coating composition binder, in accordance with the invention, is a reaction product of (a) a principal resin polyol that is at least one of a polyester polyol, a polyether polyol, a polyacrylate;

(b) a hyperbranched polyol having both external (principal) and partially embedded (secondary) hydroxyl groups in the structure thereof; and (c) a crosslinker that is at least one of an isocyanate, an isocyanurate, an epoxide, an aminoplast, an anhydride, and the corresponding polyacids of the anhydrides.

Preferably, the principal resin polyol is present in an amount ranging from 0–80 percent of the total solids content of the binder, more preferably between 20–60 percent and most preferably between 30–50%.

Preferably, the hyperbranched polyol is present in an amount ranging from 10–90 percent of the total solids content of the binder, more preferably between 10–60 percent and most preferably between 20–50%.

Preferably, the crosslinker is present in an amount ranging from 10–30 percent of the total solids content of the binder, more preferably between 10–25 percent and most preferably between 10–20%.

Principal Resin Polyol

As noted, a binder according to the invention may include a principal resin polyol that is at least one of a polyester polyol, a polyether polyol, and a polyacrylate.

Examples of polyester and polyether polyols may be found, for example, in U.S. Pat. Nos. 4,216,107, 4,305,861, and 4,582,926, the disclosures of which are incorporated herein by reference. Non-limiting examples of producing the polyester and polyether polyols from these patents are summarized below.

The polyester or polyether polyols can be obtained by catalytic esterification of (a) polyols with carboxylic acid anhydrides to form carboxylic acid half-esters and subsequent (b) oxyalkylation of the carboxylic acid half-esters with alkylene oxides. The carboxylic acid half-esters (a) are first prepared from polyols or polyol mixtures having from 2 to 6 hydroxyl groups, and an organic carboxylic acid anhydride or carboxylic acid anhydride mixture in the presence of a catalyst at temperatures from 50° C. to 240° C. and reaction times of 0.5 to 8 hours. The basic polyol and carboxylic acid anhydride components are thus reacted in such amounts that 1 to 6 moles of carboxylic acid anhydride is present per mole polyol, and 1 to 6 equivalents hydroxyl groups are present per equivalent of anhydride group in the reaction mixture. The resulting carboxylic acid half-esters are then oxyalkylated (b) in the presence of 0.05 to 2.0 parts by weight based on 100 parts by weight carboxylic acid half-ester with from 1 to 1.5 moles of alkylene oxide per equivalent carboxyl group. The oxyalkylation is generally performed at temperatures from 80° to 160° C., preferably from 90° to 130° C., at standard pressure, or, preferably, at elevated pressure, for example from 0.5 to 10 bar, advantageously in the presence of inert gases such as nitrogen, helium, neon, etc., or their mixtures. After an acid number of less than 1 has been reached, the oxyalkylation is ended. If the reaction mixture still contains free monomeric alkylene oxide, the oxide is best distilled off at a reduced pressure.

In another example, polyepoxides and epoxide resin hardeners are dissolved in polyols in such quantities that the resultant polymer polyol dispersions contain 1 to 50 percent by weight polymer particles based on the total weight. Following this, a polyaddition reaction is allowed to take place at a rate of reaction which can be adjusted by means of the reaction temperature. The course and the end of the reaction can be determined by means of viscosity measurements. The size of the polymer particles in the polyol dispersion can be influenced by the selection of the raw materials as well as their concentration in the polyol and the reaction temperature. Reaction temperatures of −20° C. to +150° C. have proven to work well. Generally, the reaction times are between 30 minutes and 96 hours, preferably between 1 and 24 hours. Polyols, suitable as dispersing medium and liquid at reaction temperature, have functionalities of 2 to 8. Proven to work well and therefore preferably used are polyester polyols and particularly polyoxyalkylene polyether polyols. Other hydroxyl-group containing polymers with the above mentioned molecular weight such as polyester amides, polyacetals and polycarbonates, particularly those produced by transesterification of diphenylcarbonate and 1,6-hexanediol may be employed. The polyester polyols may be produced from the reaction of dicarboxylic acids, preferably aliphatic dicarboxylic acids having 2 to 12 carbon atoms in the alkylene radical and multi-functional alcohols, preferably diols. These include aliphatic dicarboxylic acids such as pimelic acid, suberic acid, azelaic acid, sebacic acid, undecanedioic acid, dodecanedioic acid, and preferably succinic, glutaric and adipic acid, and aromatic dicarboxylic acids such as phthalic acid and terephthalic acid as well as mixtures of such carboxylic acids. Examples of di- and multifunctional, particularly trifunctional, alcohols are: diethylene glycol, 1,2- or 1,3-propylene glycol, dipropylene glycol, 1,5-pentanediol, 1,10-decanediol, glycerine, trimethylolpropane, and preferably ethylene glycol, 1,4-butanediol, and 1,6-hexanediol. The polyester polyols have molecular weights of 200 to 8,000 and hydroxyl numbers of 35 to 180.

Examples of hydroxyl-containing polyacrylates may be found, for example, in U.S. Pat. No. 5,759,631, the disclosure of which is also incorporated by reference.

A non-limiting example from this patent of the hydroxyl-containing polyacrylate can be obtained by polymerizing (a) from 5 to 80% by weight of a cycloaliphatic ester of methacrylic acid and/or acrylic acid, or of a mixture of such monomers, (b) from 10 to 50% by weight of a hydroxyl group-containing alkyl ester of methacrylic acid and/or acrylic acid, or of a mixture of such monomers, (c) from 0 to 25% by weight of a hydroxyl group-containing, ethylenically unsaturated monomer which is different from (a) and (b), or of a mixture of such monomers, (d) from 5 to 80% by weight of an aliphatic ester of methacrylic and/or acrylic acid which is different from (a), (b), (c) and (f), or of a mixture of such monomers, (e) from 0 to 40% by weight of an aromatic vinyl hydrocarbon which is different from (a), (b), (c), (d) and (f), or of a mixture of such monomers, and (f) from 0 to 40% by weight of a further ethylenically unsaturated monomer which is different from (a), (b), (c), (d) and (e), or a mixture of such monomers, to give a polyacrylate resin having a number-average molecular weight Mn of from 1000 to 5000, a ratio of the weight-average molecular weight Mw to the number-average molecular weight Mn of less than 5.0, preferably from 1.8 to 4.0, and an OH number of from 60 to 180, preferably from 100 to 150, mg of KOH/g, the sum of the proportions by weight of components (a) to (f) always being 100% by weight and the monomers or monomer mixtures employed as component (b) only being those which, on polymerization of the respective monomer alone, produce a polyacrylate and/or polymethacrylate resin having a glass transition temperature of from −10° C. to +6° C. or from +60° C. to 80° C. The polymerization of the monomer components (a) to (f) is preferably carried out with the exclusion of oxygen, for example by working in a nitrogen atmosphere. The reactor is equipped with appropriate stirring, heating and cooling devices and with a reflux condenser to retain volatile constituents such as, for example styrene. The polymerization reaction is carried out at temperatures of from 100° to 180° C. using appropriate polymerization initiators and, if desired, polymerization regulators.

Preferably, the principal resin polyol is present in an amount ranging from 0–80 percent of the total solids content of the binder, more preferably between 20–60 percent and most preferably between 30–50%.

Hyper-Branched Polyols

As noted above, hyperbranched polyols are used as one component of a polyol mixture, in forming a coating composition binder according to the practice of the present invention.

Hyperbranched polyols, which are usable to form binders for coating compositions in accordance with the present invention, include both external (principal) and partially embedded (secondary) hydroxyl groups in the structure thereof. As used throughout the present specification, the term "principal hydroxyl group" is intended to mean a hydroxyl group located at or near the outer periphery of the hyperbranched molecule, so as to be relatively accessible for reaction, and the term "secondary hydroxyl group" is intended to mean a hydroxyl group that is located deeper in the branched structure than the outer periphery, which is at least partially embedded in the macromolecule. Preferably, the external hydroxyl groups comprise from about 60 to about 90% of the combined total of the external and partially embedded hydroxyl groups.

While not wishing to be bound by any theory, it is believed that the inclusion of this dual level of hydroxyl functionality in the hyperbranched polyol structure provides significant benefits to a coating composition made therewith, such as higher solids content, improved flexibility, affects hardness, and improved adhesion to subsequent repair coatings applied thereover. Also, depending on the ratios of the principal to the secondary hydroxyls present, the final properties of the coating can be tailored to suit the needs of the application.

Prior art hyperbranched polyols are known to be brittle. Standard tests for measuring the brittleness are the GM Engineering Standards Materials and Processes test GM9508P and ASTM D3170. The higher the number, the less brittle the sample. Prior art hyperbranched polyols achieve a result of 1 to 2. The hyperbranched polyols of the present invention, however, can achieve a result of 5 to 6.

The present invention requires a hyper-branched polyol as one component of the binder or coating composition. The hyper-branched polyol combines relatively high molecular weight with relatively low viscosity compared to linear polyols. The hyperbranched polyol replaces part of the principal resin polyol and/or the organic solvent that would otherwise be needed, decreasing the volume of solvent necessary to attain a target viscosity and functionality, and allows for a higher solids content than would be feasible without its inclusion. This decreases the overall volatile organic content (VOC) of the resulting composition.

Examples of suitable hyperbranched polyester polyols, which are usable as reactive intermediates in accordance with the invention, are those disclosed in U.S. patent application Ser. No. 09/470,405, filed Dec. 22, 1999, the disclosure of which is incorporated herein by reference.

Hyper-branched polyester polyols, in accordance herewith, are highly functionalized compounds having relatively low OH equivalent weight. Generally, the OH equivalent ranges from 80–500 g/OH. They have different viscosity and solubility profiles than conventional 'linear' polyols.

Hyper-branched polyester polyols may be used as reactive diluents, which will cross-link with isocyanates, isocyanurates, epoxides, anhydrides or their corresponding polyacids and/or aminoplasts to form a binder having particular properties, to control the rheology of a coating system. If desired, hyper-branched polyols may be used as one part of a polyol mixture, which includes other polyols selected for their contributions to the final composition.

Preferred hyperbranched polyester polyols according to the invention include a) a central nucleus comprising a hydrocarbon structure with a plurality of oxygen atoms;

b) a first chain extension attached to the central nucleus, the first chain extension being formed from a compound comprising a carboxyl group and a plurality of hydroxyl groups;

c) an intermediate substituent attached to the first chain extension, the intermediate substituent being formed from a compound that is at least one of polyfunctional carboxylic acids and anhydrides and their corresponding polyacids thereof; and d) a second chain extension attached to the intermediate substituent, the second chain extension being formed from a compound having a terminal or non-terminal epoxide group thereon.

Preferably, the hyperbranched polyol is present in an amount ranging from 10–90 percent of the total solids content of the binder, more preferably between 10–60 percent and most preferably between 20–50%.

In one preferred embodiment of the present invention, the hyper-branched polyol incorporates multiple functionalities and may include at least one principal carbamate functionality.

Method of Making the Polyol

The present invention also encompasses a method of making a hyperbranched polyester polyol. A method in accordance with the invention, generally, includes a first step of reacting a starter polyol with a first chain extender, which contains a plurality of hydroxyl groups and also contains a carboxyl group, to form a first generation branched core.

In this first step, preferred starter polyols are those having two or more reactive hydroxyl groups thereon. Diols such as ethylene glycol, propylene glycol, dimethylolpropionic acid, and related structures may be used as starter polyols. Triols such as glycerol, trimethylol propane, trimethylol butane and related structures are favored, although compounds having four hydroxyl groups thereon, such as pentaerythritol, may also be used as starter polyols. A particularly preferred starter polyol, for use in forming the central core, is trimethylol propane (TMP).

Also in the first step, materials usable as the first chain extender include carboxylic acids having two or more hydroxyl groups thereon, as well as carboxylic acids of the type described in which one or more of the hydroxyl groups have been hydroxyalkyl substituted. A particularly preferred material for use as the first chain extender is dimethylol propionic acid (DMPA).

A conventional esterification catalyst may be used in this first step, if desired, such as sulfuric acid, dibutyltin oxide, or other known catalyst.

Optionally, this first generation branched core may be further reacted with the first chain extender, or with another different monomer having a similar structure as described above in connection with the first chain extender, one or more additional times, as desired, to cause further branching and growth thereof. Such additional polymerization of the first generation branched core, where used, forms a second, third, fourth, or higher generation branched core, as desired, and according to the particular needs under consideration.

The next step in the method of forming the hyperbranched macromolecule hereof involves reacting the branched core, at whatever level of generational branching is used, with an intermediate substituent which includes a polyfuntional carboxylic anhydride or acid thereof, to form an intermediate polyester macromolecule having reactive carboxyl groups thereon. The intermediate substituent may be selected from, e.g., phthalic acid, isophthalic acid, orthophthalic anhydride, tetrahydrophthalic anhydride, hexahydrophthalic anhydride, trimellitic anhydride, succinic anhydride and similar such compounds. Preferred materials for use as the intermediate compound are cyclic polyfunctional carboxylic anhydrides. Particularly preferred materials, for use as the intermediate substituent, are hexahydrophthalic anhydride (HHPA) and methyl, hexahydrophthalic anhydride.

The next step in the method of forming the hyperbranched polyol macromolecule hereof involves reacting the intermediate polyester macromolecule with a second chain extender to form a hyperbranched polyol macromolecule having both principal and secondary hydroxyl groups thereon.

The second chain extender is a flexible hydrocarbon compound having a terminal or non-terminal epoxide group thereon. The second chain extender may be selected from the group consisting of glycidyl esters, glycidyl ethers, epoxides, epoxy resins, epoxidized acids, and epoxidized alcohols. Preferably, the second chain extender is selected from the group consisting of glycidyl esters and glycidyl ethers.

Some examples of possible compounds usable as the second chain extender include cyclohexane oxide, any aliphatic chain with terminal or non-terminal epoxide group such as, for example, cis2,3-epoxybutane, 1-2-epoxybutane, 1-2-epoxyhexane, 1-2-epoxyoctane, 1-2-epoxydecane, cis-7,8-epoxy-2-methyloctadecane, hexafluoropropylene oxide, and the glycidyl esters sold by the Shell Chemical company under the trademark CARDURA. The above list is intended to be illustrative rather than limitative. Those skilled in the art will realize that many other compounds may be used.

Optional Carbamate Group

Optionally, the principal resin polyol, the hyper-branched polyol, or both may have a primary carbamate functional group incorporated therein.

As used herein, the term 'primary carbamate' is intended to mean a functional group of the general structure $H_2N$—COOR, where R is alkyl, aryl, or alkylaryl group. Where used, the carbamate contributes to a urethane structure being provided in the final cured coating.

A variety of carbamate-functional materials may be used. These include materials described in WO 94/10211 and U.S. Pat. No. 5,356,669, the disclosures of which are incorporated herein by reference.

A carbamate-functional polymer may be used as the carbamate-functional material in the practice of the present invention. Carbamate-functional polymer components used in the composition of the invention can be prepared in a variety of ways. One way to prepare such a polymer is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference.

One method of synthesis involves reaction of a hydroxy ester with urea to form the carbamyloxy carboxylate (i.e., carbamate-modified acrylic). Another method of synthesis reacts an alpha,beta-unsaturated acid ester with a hydroxy carbamate ester to form the carbamyloxy carboxylate.

Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer.

Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing carbamate-functional polymers is to react an already-formed polymer such as an acrylic polymer with another component to form a carbamate-functional group appended to the polymer backbone, as described in U.S. Pat. No. 4,758,632, the disclosure of which is incorporated herein by reference.

One technique for preparing carbamate-functional polymers involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate.

Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A preferred approach is a transcarbamylation or transesterification reaction of a hydroxy-functional polymer with an alkyl carbamate or hydroxyalkyl carbamate. A more difficult, but feasible way of preparing the polymer would be to trans-esterify an acrylate polymer with a hydroxyalkyl carbamate.

Lower molecular weight carbamate-functional materials, such as oligomeric or non-polymeric materials may also be used in the practice of the present invention. Such compounds can be prepared in a variety of ways.

One way to prepare such carbamate-functional materials is to react an alcohol ('alcohol' is defined herein as having one or more OH groups) with a urea to form a compound with carbamate groups. This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin oxide). Other techniques for preparing carbamates are also known in the art and are described, for example, in P. Adams & F. Baron, "Esters of Carbamic Acid", Chemical Review, v. 65, 1965.

The Crosslinker Component

As noted, the binder or coating composition according to the invention necessarily includes a crosslinker that is at least one of an isocyanate, an isocyanurate, an epoxide, an aminoplast, an anhydride, and the corresponding polyacids of the anhydrides.

In the presence of a suitable catalyst and under appropriate conditions including elevated temperatures, the crosslinker reacts with the polyol blend to produce a cured coating composition. Preferably, the crosslinker is present in an amount ranging from 10–30 percent of the total solids content of the binder, more preferably between 10–25 percent and most preferably between 10–20%.

Isocyanates and Isocyanurates

Many isocyanates and isocyanurates are usable as crosslinkers according to the invention. Suitable isocyanates include toluene diisocyanates, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, and polyisocyanates Suitable isocyanates, which may be used in the practice of the present invention, include any polyisocyanate and is preferably a diisocyanate, e.g., hydrocarbon diisocyanates or substituted hydrocarbon diisocyanates. Many such organic diisocyanates are known in the art, including p-phenylene diisocyanate, biphenyl 4,4'-diisocyanate, toluene diisocyanate, tetramethylxylene diisocyanate, 3,3'-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene-bis-(4 cyclohexylisocyanate). There can also be employed isocyanate-terminated adducts of diols, such as ethylene glycol, or 1,4-butylene glycol, etc. These are formed by reacting more than one mole of a diisocyanate, such as those mentioned, with one mole of a diol to form a longer chain diisocyanate. While diisocyanates are preferred, other multi-functional isocyanates may be utilized. Examples are 1,2,4-benzene triisocyanate and polymethylene polyphenyl isocyanate.

Where isocyanates are used as crosslinkers, it is preferred to employ an aliphatic diisocyanate, since it has been found that these provide better exterior weatherability and color stability in the finished coating. Examples include 1,6-hexamethylene diisocyanate, 1,4-butylene diisocyanate, methylene bis (4-cyclohexyl isocyanate) and isophorone diisocyanate. Mixtures of diisocyanates can also be employed.

Epoxides

The crosslinker according to the invention may be an epoxide, or may include an epoxide component. Epoxides are well-known in the art. The epoxide may be of the general formula:

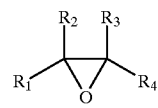

where R1, R2, R3, and R4 are each independently H (with the proviso that at least one of R1–R4 is other than H), an organic radical, which may be polymeric or non-polymeric and may contain unsaturation and/or heteroatoms, or one of R1 or R2 together with one of R3 or R4 may form a cyclic ring, which may contain unsaturation and/or heteroatoms.

Useful epoxides can be prepared from alcohols, e.g., butanol, trimethylol propane, by reaction with an epihalohydrin (e.g., epichlorohydrin), or by reaction of an allyl group with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate or polymer or oligomer with glycidol. Other known polyepoxides, e.g., epoxy-novolacs, may also be used.

In one preferred embodiment, the epoxide is an acrylic-containing polymer or oligomer, preferably deriving its epoxy groups from glycidyl methacrylate monomer, glycidyl acrylate, allyl glycidyl ether, cyclohexyl monoepoxy methacrylate, the epoxide of the dimer of cylopentadiene methacrylate, or epoxidized butadiene, more preferably glycidyl methacrylate. The epoxide is preferably present in the resin in an amount of from 0.0001 to 0.05 equivalents of epoxy per 100 g of resin. The resin is preferably present in the coatings composition from 10–20% by weight.

Anhydrides or Their Corresponding Polyacids

Non-limiting examples of anhydrides that are usable as crosslinkers in the practice of the present invention include, without limitation, phthalic, terephthalic, isophthalic, adipic, succinic, fumaric, maleic, azeleic, sebacic, dimer fatty, benzenetricarboxylic, hexahydrophthalic, methyl hexahydrophthalic, glutamic, or the corresponding polyacids of these anhydrides. Other acids that may be included are the acids having between 12 and 36 carbon atoms in the alkyl portion of the molecule, with the dimer fatty acids being particularly preferred.

Aminoplasts

The pre-polymer reaction mixture may include an aminoplast resin crosslinking agent, in order to form a curable coating composition. Aminoplast resins are aldehyde condensation products of melamine, urea, and similar compounds. Products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine acetoguanamine, ammeline, 2-chloro-4,6-diamino-1,3,5-triazine, 6-methyl-2,4-diamino, 1,3,5-triazine, 3-5-diaminetriazole, triaminopyrimidine, 2-mercapto-4,6-diaminopyrimidine, 2,4,6-triethyl triamino-1,3,5-triazine, and the like.

While the aldehylde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and aromatic alcohols, cyclic alcohols, for example, cyclohexanol, monoethers or glycols such as those sold under the trademarks CELLOSOLVE and CARBITOL® from Union Carbide, and halogen-substituted or other substituted alcohols, such as 3-chloropropanol. The preferred amine-aldehyde resins are etherified with methanol or butanol.

Mixtures of the above crosslinkers may also be used, as appropriate.

Method of Making

A method of making a binder comprising:
a) providing a principal resin polyol as a first reactant, the principal resin polyol comprises at least one of a polyester polyol, a polyether polyol, and a polyacrylates;
b) providing an effective amount of a second reactant to the principal resin polyol to form a polyol reaction mixture, wherein the second reactant is a hyperbranched polyol comprising both external and partially embedded hydroxyl groups in the structure thereof; and
c) providing a crosslinker to the reaction mixture.

A method of making a coating composition, comprising:
a) providing a principal resin polyol as a first reactant, the principal resin polyol comprises at least one of a polyester polyol, a polyether polyol, and a polyacrylate;
b) providing an effective amount of a second reactant to the principal resin polyol to form a polyol reaction mixture, wherein the second reactant is a hyperbranched polyol comprises both external and partially embedded hydroxyl groups in its structure;
c) providing an effective amount of a polymerization catalyst;
d) providing a crosslinker; and
e) adding a solvent.

Additionally, the coating composition can be applied to a substrate and cured. Generally, the coating composition can be cured at a temperature from about 60° C. to about 150° C., but any temperature that causes the components of the coating composition to react is acceptable.

The solvent preferably comprises at least one of an alcohol and a polar organic solvent.

Catalysts

For isocyanate based crosslinkers, the catalysts that can be used include, but are not limited to, dibutyl tin oxide, dibutyl tin dilaurate, tin catalysts, and tertiary amines. For aminoplast crosslinkers, the catalysts that can be used include, but are not limited to, benzene sulfonic acid, dodecylbenzene sulfonic acid, and tertiary amines. For epoxide based crosslinkers, the catalysts that can be used include, but are not limited to, tertiary amines.

EXAMPLES

The following examples are included to illustrate application of the invention, and are not intended to be limitative.

Example 1

A hyperbranched polyester polyol resin was prepared by mixing together the ingredients listed in Table 1, in the manner outlined below.

TABLE 1

| | |
|---|---|
| TMP (trimethylol propane) | 1 mole |
| DMPA (dimethylpropionic acid) | 3 moles |
| HHPA (hexahydrophthalic anhydride) | 3 moles |
| CARDURA E-10* glycidyl ester of neodecanoic acid | 3 moles |

*(CARDURA is a trademark of the Shell Chemical Company.)

Sixty-seven (67) grams of trimethylol propane was charged into a reaction flask equipped with a stirrer, along with 201 grams of dimethylol propionic acid and 0.2 grams of sulfuric acid as a catalyst. The temperature was raised, to 140° C., over a 45 minute period. A stream of nitrogen was used to help remove the water formed during the condensation reaction. A vacuum pump was connected to the flask at the end of the reaction to complete the removal of the water of the condensation reaction.

This reaction resulted in the synthesis of a first generation branched core. This composition may be viewed as a first generation polyester polyol and the reaction may be suspended at this point to provide a polyol usable to make other products.

In this Example, the reaction was continued to make a second generation branched core. Two hundred thirty-one (231) grams of HHPA was added and was heated to 140° C. and the reaction was monitored by IR equipment for the disappearance of the anhydride peak. This resulted in the formation of an intermediate polyester macromolecule. Fifty (50) grams of AROMATIC 100 (a solvent naphtha (petroleum), light aromatic sold by ExxonMobil) were added to adjust the viscosity of the product.

When this reaction was complete, 342 grams of CARDURA E-10 glycidyl ester were added and the temperature was kept at 140° C. Again, the reaction was followed by the epoxide peak in IR monitoring equipment. Completion of the reaction resulted in formation of a hyperbranched polyol macromolecule that had six hydroxyl groups, with a mixture of primary hydroxyl groups and secondary hydroxyl groups, and no carboxyl groups.

The final solids percentage of the total composition was 80% by weight, and the average OH equivalent weight (including both primary and secondary hydroxyl groups) was 271 grams per hydroxyl per non-volatile solids.

Example 2

A hyperbranched polyester polycarbamate was synthesized as follows:

An isocyanate functional carbamate was synthesized from

| IPDI (isophorone diisocyanate) | 1 mole |
| HPC (hydroxy propyl carbamate) | 1 mole |

Two hundred twenty-two (222) g of IPDI was reacted with 119 g of HPC at 90° C. with stirring. The reaction stalled when half of the NCO was reacted (by titration), giving a carbamate with an isocyanate equivalent weight of 341. The product was diluted with AROMATIC 100 to give an final solids of 80%.

The 340 g of isocyanate carbamate was then reacted with 271 g of the polyester polyol from example 1 (equivalent weight 271 g/OH). The completion of the reaction was followed by IR and titration. One hundred sixty-four grams of AROMATIC 100 was added to the product. The carbamate equivalent weight was 612 g/carbamate/NV and had a final NV (non-volatile) of 63%.

Example 3

The polyester polyol from example 1 (equivalent weight of 271 g/OH per non-volatiles) was reacted with methyl carbamate, catalyzed by butyl, stannoic acid with the removal of methanol as an azeotrope with toluene. The ingredients are listed in the following table.

TABLE 2

| Polyester polyol | 1000 grams |
| Methyl carbamate | 1252 grams |
| BSA (butyl, stannoic acid) | 3 grams |
| Toluene | 225 grams |

The mixture was formed by determining the OH number, and was stopped when 90% of the primary hydroxyls were reacted. The resulting polyester polyol carbamate had 3 primary and secondary hydroxyls and three primary carbamate functionalities. The equivalent weights were 650 g/carbamate per non-volatiles, and 526 g/OH per non-volatiles.

Example 4

An acrylic polymer with hydroxy functionalities can be synthesized from ingredients according to the following table:

TABLE 3

| Hydroxyethylmethacrylate | 1300 g |
| Styrene | 250 g |
| Ethylhexylacrylate | 1500 g |
| t-butylperoxyoctoate | 244 g |

The polymerization was done at 140° C. in Toluene solvent with the monomers and initiator added over four hours. The resulting acrylic polymer had a final molecular weight of ca. 3000 and a hydroxyl equivalence of 345 g/OH/NV with a NV of 70%.

Example 5

An acrylic carbamate functional polymer was synthesized according to the following table.

TABLE 4

| Hydroxy acrylic polymer of example 4 | 2214 g |
| Methylcarbamate | 415 g |
| Butylstannoic acid | 2 g |

The reactants were combined and reacted at 130–135° C., and the methanol was removed as an azeotrope of toluene. The reaction was stopped when the transcarbamation was complete to 90–95% theoretical that was determined by analyzing for the hydroxyl number of the resin. Excess methylcarbamate was removed by vacuum stripping, and the remaining resin was redissolved in amyl acetate. For a 90% carbamated polymer, the resin will have an equivalent weight of 400 g/carbamate/NV, with a final solids at 70%.

Paint Example 1

A contrasting series of 2 clearcoat paints were made, one with a hyperbranched polyol component and one without the hyperbranched polyol. The ingredients were mixed in the order listed, with stirring, at ambient conditions. The ingredients used to make the clearcoat paints are listed in the following table:

TABLE 5

| Component | Amount | Amount |
| --- | --- | --- |
| Acrylic polyol of example 4 | 500 g | 450 g |
| Hyperbranched polyol of example 1 |  | 69.5 g |
| Melamine:formaldehyde crosslinker | 70 g | 70 g |
| DDBSA (dodecylbenzene sulfonic acid) (catalyst) | 0.850 g | 0.850 g |
| Amyl acetate (solvent) | 364 g | 292 g |
| Final Solids | 45% | 50% |
| Viscosity - Frd #4 cup @ 26.6° C. (80° F.) | 45" | 45" |

The paint was sprayed on a black basecoat and baked at 126.7° C.(260° F.) for 30 minutes. The resulting film was satisfactory and had an MEK (methyl ethyl ketone) double rub of over 200.

Paint Example 2

A second contrasting series of clearcoat paints were made, one with a hyperbranched polyol component and one without the hyperbranched polyol. The ingredients were mixed in the order listed, with stirring, at ambient conditions. The ingredients used to make the clearcoat paints are listed in the following table:

TABLE 6

| Component | Amount | Amount |
| --- | --- | --- |
| Acrylic carbamate of example 5 | 570 g | 460 g |
| Hyperbranched polycarbamate of example 3 |  | 194.3 |
| Melamine:formaldehyde crosslinker | 70 g | 70 g |
| DDBSA (dodecylbenzene sulfonic acid) (catalyst) | 0.850 g | 0.850 g |
| Amyl acetate (solvent) | 402 g | 304 g |
| Final Solids | 45% | 50% |
| Viscosity - Frd #4 cup @ 26.6° C. (80° F.) | 45" | 45" |

The paint was sprayed on a black basecoat and baked at 126.7° C. (260° F.) for 30 minutes. The resulting film was satisfactory and had an MEK double rub of over 200.

Paint Example 3

Another example of a clearcoat paint was made, using a higher percentage of a hyperbranched polyol component, and using both an aminoplast crosslinker and an isocyanate crosslinker. In this example, the only polyol used was the hyperbranched polyol. The ingredients were mixed in the order listed, with stirring, at ambient conditions. This example shows that using the hyperbranched polyol according to the invention, a higher solids content may be used without raising the viscosity out of the useful range.

The ingredients used to make the clearcoat paint of this example are listed in the following table:

TABLE 7

| | |
|---|---|
| Hyperbranched polyester example 2 | 65.74 parts |
| Melamine:formaldehyde cross-linker: | 14.06 parts |
| DMP (dimethyl propanol) blocked isocyanate: | 14.06 parts |
| DDBSA (dodecyl benzene sulfonic acid) | 0.85 parts |
| Solvent (butyl acetate) | 5.29 parts |
| % non-volatiles: | 58 |
| Viscosity @ 80° C. | 35 sec (Ford visc #4 cup) |

The paint was sprayed on a black basecoat and baked at 137.8° C. (280° F.) for 30 minutes. The resulting film was very smooth and had an MEK double rub of over 200.

Although the present invention has been described herein with respect to a preferred embodiment thereof, the foregoing description is intended to be illustrative, and not restrictive. Those skilled in the art will realize that many modifications of the preferred embodiment could be made that would be operable. All such modifications that are within the scope of the claims are intended to be within the scope and spirit of the present invention.

What is claimed is:

1. A binder comprising:
   a. a principal resin polyol comprising at least one of a polyester polyol, a polyether polyol, and a polyacrylate;
   b. a hyperbranched polyol comprising both external and partially embedded hydroxyl groups in the structure thereof; and
   c. a crosslinker,
   wherein the hyperbranched polyol comprises
      I. a central nucleus comprising a hydrocarbon structure with a plurality of oxygen atoms;
      II. a first chain extension attached to the central nucleus, the first chain extension being formed from a compound comprising a carboxyl group and a plurality of hydroxyl groups;
      III. an intermediate substituent attached to the first chain extension, the intermediate substituent being formed from a compound comprising at least one of polyfunctional carboxylic acids and anhydrides and corresponding polyacids thereof; and
      IV. a second chain extension attached to the intermediate substituent, the second chain extension being formed from a compound comprising at least one of cis 2,3-epoxybutane, 1-2-epoxybutane, 1-2-epoxyhexane, 1-2-epoxydecane, cis-7,8-epoxy-2methyloctadecane, and hexafluropropylene oxide.

2. The binder of claim 1, wherein the crosslinker comprises at least one of an isocyanate, an isocyanurate, an epoxide, an aminoplast, an anhydride, and corresponding polyacids of the anhydrides.

3. The binder of claim 1, wherein at least one of:
   a. the principal resin polyol is present in an amount ranging from greater than 0 to 80 percent of the total solids content of the binder,
   b. the hyperbranched polyol is present in an amount ranging from 10–90 percent of the total solids content of the binder, and
   c. the crosslinker is present in an amount ranging from 10–30 percent of the total solids content of the binder.

4. The binder of claim 1, wherein at least one of:
   a. the principal resin polyol is present in an amount ranging from 20–60 percent of the total solids content of the binder,
   b. the hyperbranched polyol is present in an amount ranging from 10–60 percent of the total solids content of the binder, and
   c. the crosslinker is present in an amount ranging from 10–25 percent of the total solids content of the binder.

5. The binder of claim 1, wherein at least one of:
   a. the principal resin polyol is present in an amount ranging from 30–50 percent of the total solids content of the binder,
   b. the hyperbranched polyol is present in an amount ranging from 20–50 percent of the total solids content of the binder, and
   c. the crosslinker is present in an amount ranging from 10–20 percent of the total solids content of the binder.

6. The binder of claim 1, wherein at least one polyol selected from the principal resin polyol and the hyperbranched polyol additionally comprises a carbamate functionality therein.

7. The binder of claim 1, wherein the external hydroxyl groups comprise from 60% to 90% of a total of external and partially embedded hydroxyl groups.

8. A method of making a coating composition comprising:
   a. providing a principal resin polyol as a first reactant, the principal resin polyol comprises at least one of a polyester polyol, a polyether polyol, and a polyacrylate;
   b. providing an effective amount of a second reactant to the principal resin polyol to form a polyol reaction mixture, wherein the second reactant is a hyperbranched polyol comprises both external and partially embedded hydroxyl groups in its structure;
   c. providing an effective amount of a polymerization catalyst;
   d. providing a crosslinker; and
   e. adding a solvent,
   wherein the hyperbranched polyol comprises
      I. a central nucleus comprising a hydrocarbon structure with a plurality of oxygen
      II. a first chain extension attached to the central nucleus, the first chain extension being formed from a compound comprising a carboxyl group and a plurality of hydroxyl groups;
      III. an intermediate substituent attached to the first chain extension, the intermediate substituent being formed from a compound comprising at least one of polyfunctional carboxylic acids and anhydrides and corresponding polyacids thereof; and
      IV. a second chain extension attached to the intermediate substituent, the second chain extension being formed from a compound comprising at least one of cis 2,3-epoxybutane, 1-2-epoxybutane, 1-2-epoxyhexane, 1-2-epoxydecane, cis-7,8-epoxy-2methyloctadecane, and hexafluropropylene oxide.

9. The method of claim 8, wherein the crosslinker comprises at least one of an isocyanate, an isocyanurate, an epoxide, an aminoplast, an anhydride, and corresponding polyacids of the anhydrides.

10. The method of claim 8, wherein at least one polyol selected from the principal resin polyol and the hyperbranched polyol comprises a carbamate functionality therein.

11. The method of claim 8, wherein the crosslinker is an aminoplast.

12. The method of claim 8, wherein the crosslinker is an epoxide.

13. The method of clam 8, further comprising applying the coating composition to a substrate and curing.

14. The method of claim 8, wherein the external hydroxyl groups comprise from 60% to 90% of a total of external and partially embedded hydroxyl groups.

15. A method of making a binder comprising:
   a. providing a principal resin polyol as a first reactant, the principal resin polyol comprises at least one of a polyester polyol, a polyether polyol, and a polyacrylates;
   b. providing an effective amount of a second reactant to the principal resin polyol to form a polyol reaction mixture, wherein the second reactant is a hyperbranched polyol comprising both external and partially embedded hydroxyl groups in the structure thereof; and
   c. providing a crosslinker to the reaction mixtures
   wherein the hyperbranched polyol comprises
      I. a central nucleus comprising a hydrocarbon structure with a plurality of oxygen atoms;
      II. a first chain extension attached to the central nucleus, the first chain extension being formed from a compound comprising a carboxyl group and a plurality of hydroxyl groups:
      III. an intermediate substituent attached to the first chain extension, the intermediate substituent being formed from a compound comprising at least one of polyfunctional carboxylic acids and anhydrides and corresponding polyacids thereof; and
      IV. a second chain extension attached to the intermediate substituent, the second chain extension being formed from a compound comprising at least one of cis 2,3-epoxybutane, 1-2-epoxybutane, 1-2-epoxyhexane, 1-2-epoxydecane, cis-7,8-epoxy-2methyloctadecane and hexafluropropylene oxide.

16. The method of claim 15, wherein the crosslinker comprises at least one of an isocyanate, an isocyanurate, an epoxide, an aminoplast, an anhydride and corresponding polyacids of the anhydrides.

17. The method of claim 15, wherein at least one polyol selected from the principal resin polyol and the hyperbranched polyol comprises a carbamate functionality therein.

18. The method of claim 17, wherein the external hydroxyl groups comprise from 60% to 90% of a total of external and partially embedded hydroxyl groups.

19. A coating composition comprising a solvent and a mixture of:
   a. a principal resin polyol comprising at least one of a polyester polyol, a polyether polyol, and a polyacrylate;
   b. a hyperbranched polyol having both external and partially embedded hydroxyl groups in the structure thereof;
   c. a crosslinker; and
   d. an effective amount of a polymerization catalyst,
   wherein the hyperbranched polyol comprises
      I. a central nucleus comprising a hydrocarbon structure with a plurality of oxygen atoms;
      II. a first chain extension attached to the central nucleus, the first chain extension being formed from a compound comprising a carboxyl group and a plurality of hydroxyl groups;
      III. an intermediate substituent attached to the first chain extension, the intermediate substituent being formed from a compound comprising at least one of polyfunctional carboxylic acids and anhydrides and corresponding polyacids thereof; and
      IV. a second chain extension attached to the intermediate substituent, the second chain extension being formed from a compound comprising at least one of cis 2,3-epoxybutane, 1-2-epoxybutane, 1-2-epoxyhexane, 1-2-epoxydecane, cis-7,8-epoxy-2methyloctadecane, and hexafluropropylene oxide.

20. The coating composition of claim 19, wherein the crosslinker comprises at least one of an isocyanate, an isocyanurate, an epoxide, an aminoplast, an anhydride, and corresponding polyacids of the anhydrides.

21. The coating composition of claim 19, wherein the coating is a thermoset coating.

22. The coating composition of claim 19, wherein at least one polyol selected from the principal resin polyol and the hyperbranched polyol comprises a carbamate functionality therein.

23. The coating composition of claim 19, wherein the external hydroxyl groups comprise from 60% to 90% of a total of external and partially embedded hydroxyl groups.

* * * * *